Patented Aug. 19, 1930

1,773,379

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

PROCESS OF VULCANIZING RUBBER

No Drawing.   Application filed May 10, 1929.   Serial No. 362,127.

The present process relates to the manufacture of a vulcanized rubber product by an improved process wherein there is employed, in addition to an accelerator and the ordinary compounding ingredients, a new type of reaction product capable of imparting age resisting or anti-oxidant properties to the rubber product.

More particularly, the present invention relates to the use of the sulfur reaction products of the condensation product of an aliphatic aldehyde and an aryl hydroxide as an anti-oxidant or age resisting compound, whereby the life or period of use of the vulcanized rubber product, with respect to aging and oxidation thereof, is greatly increased.

The age resisting characteristics of a vulcanized rubber product can be readily ascertained by subjecting samples of the vulcanized product in a bomb to the action of oxygen under pressure and maintained for several hours at an elevated temperature. The samples so treated are then examined and tested and the results compared with similar results obtained by testing the unaged vulcanized stock. The deterioration in properties suffered as a result of the oxidation treatment is indicative of the result that would be normally expected from that particular stock during service. Such a test is known as the Bierer-Davis aging test and produces an effect on a vulcanized rubber stock comparable with that resulting from several years of natural aging of the rubber.

The invention will be readily understood from the following description and examples. One of the preferred type of compounds, for example the sulfur derivative of the condensation product of phenol and butylaldehyde, was prepared in the following manner:

Substantially one molar portion of phenol (94 parts) and substantially one molar portion of butylaldehyde (72 parts) were condensed in the presence of a comparatively small portion of hydrochloric acid, for example 0.5 parts. After adding a comparatively small portion of ammonia to the reaction mixture to neutralize any acidity that may have developed, steam was passed therethrough to eliminate any unreacted phenol or aldehyde. The residue was then mixed with approximately one atomic weight portion of sulfur and the mixture heated for a period of time necessary to complete the desired reaction at approximately 170 to 180° C. in the presence of approximately 0.2 parts of a catalyst or condensing agent, for example, iodine.

A sample of the reaction product so obtained was then incorporated in the usual manner in a tread stock comprising 100 parts of smoked sheets, 40 parts of carbon black, 10 parts of zinc oxide, 2 parts of a blended mineral oil and rosin, 3.25 parts of sulfur, 1.0 part of diphenyl-guanidine, 1.0 part of anti-oxidant.

The stock was then vulcanized by heating sheets of the stock in the usual manner for different periods of time at the temperature given by forty pounds of steam pressure per square inch, that is 287° F. Portions of the stock cured as described were then artificially aged by heating samples of the said rubber stock in an oxygen bomb for 24 hours at a temperature of 70° C. and under a pressure of 300 pounds of oxygen per square inch. The results obtained by testing the aged and unaged stocks follow:

| Time of cure | Hours aged | Modulus of lbs./in.² at 300% | Elasticity in elongations of 500% | Tensile at break in lbs./in.² | Ultimate elongation |
|---|---|---|---|---|---|
| 60 minutes at 287° F. | 0 | 1568 | 3565 | 4460 | 605 |
| 60 minutes at 287° F. | 24 | 1278 | 2550 | 2620 | 510 |
| 90 minutes at 287° F. | 0 | 1865 | 3900 | 4385 | 565 |
| 90 minutes at 287° F. | 24 | 1355 | ---- | 1900 | 420 |

As a further example of the preferred class of compounds, substantially one molar portion of acetaldehyde (44 parts) and substantially two molar portions of phenol (188 parts) were condensed in the same manner as the condensation of substantially equimolar portions of phenol and butylaldehyde hereinbefore stated. To the reaction product thus prepared, substantially one atomic weight portion of sulfur was added and the mixture heated slowly to a maximum temperature of substantially 200° C. in the presence of approximately 0.2 parts of a catalyst or condensing agent, for example, iodine.

A sample of the material thus obtained was incorporated according to a well known manner in a tread stock of the formula hereinbefore given, with the exception that 1.0 part of sulfurized acetaldehyde-phenol product was employed in place of the anti-oxidant set forth in the example. After vulcanization by heating sheets of the stock in the usual manner for different periods of time at the temperature given by forty pounds of steam pressure per square inch, that is 287° F., portions of the stock cured as described were then aged artificially by heating samples of the said stock in an oxygen bomb for twenty-four hours at a temperautre of 70° C. and under a pressure of 300 pounds of oxygen per square inch. The data obtained on testing the aged and unaged stocks follow:

| Time of cure | Hours aged | Modulus of lbs./in.$^2$ at 300% | Elasticity in elongations of 500% | Tensile at break in lbs./in.$^2$ | Ultimate elongation |
|---|---|---|---|---|---|
| 60 minutes at 287° F. | 0 | 1435 | 3215 | 4050 | 620 |
| 60 minutes at 287° F. | 24 | 995 | ---------- | 1665 | 455 |
| 90 minutes at 287° F. | 0 | 1600 | 3480 | 4135 | 580 |
| 90 minutes at 287° F. | 24 | 1175 | ---------- | 1428 | 395 |

As a further example of the preferred class of compounds, substantially one-half a molar portion of betanaphthol (72 parts) was dissolved in substantially 150 parts of acetic acid at substantially 50° C. and approximately one-half a molar portion of n-butylaldehyde (36 parts) was added thereto in the presence of substantially 10 parts of a condensing agent, for example, hydrochloric acid. The oily reaction product was washed with a hot alkaline solution, such for example as sodium carbonate solution, and finally with boiling water. To the solid product thus obtained, after drying there was added substantially one atomic weight portion of sulfur (32 parts) and the mixture heated at a temperature of substantially 190 to 200° C. until reaction had ceased, in the presence of approximately 0.2 part of a catalyst or condensing agent, for example iodine.

On cooling the reaction product thus obtained to room temperature, a solid product was obtained which was incorporated in the usual manner in a rubber mix of the composition hereinbefore given. After vulcanization by heating sheets of the compounded stock in the usual manner for different periods of time at the temperature given by forty pounds of steam pressure per square inch, that is 287° F., portions of the stock cured as described were then aged artificially by heating samples of the said stock in an oxygen bomb for twenty-four hours at a temperature of 70° C. and under a pressure of 300 pounds of oxygen per square inch. The data obtained on testing the aged and unaged stocks follow:

| Time of cure | Hours aged | Modulus of lbs./in.$^2$ at 300% | Elasticity in elongations of 500% | Tensile at break in lbs./in.$^2$ | Ultimate elongation |
|---|---|---|---|---|---|
| 60 minutes at 287° F. | 0 | 1590 | 3630 | 4150 | 570 |
| 60 minutes at 287° F. | 24 | 1138 | ---------- | 1745 | 440 |
| 90 minutes at 287° F. | 0 | 1825 | 3790 | 4360 | 560 |
| 90 minutes at 287° F. | 24 | 1205 | ---------- | 1375 | 310 |

The examples of the preferred class of compounds as hereinbefore described show that the type of compounds herein disclosed comprise an important group of anti-oxidant or anti-aging compounds. As is seen in no case did the rubber compound melt in the bomb to a shapeless mass during the artificial aging, as would have been the case if no anti-oxidant was employed.

Other methods of preparing the sulfur reaction product of the condensation product of substantially equi-molar portions of beta naphthol and n-butylaldehyde may be employed. Thus, substantially one molar portion of beta naphthol (144 parts) and substantially one molar portion of n-butylaldehyde (72 parts) were heated to substantially 60 to 100° C. in the presence of substantially 0.5 parts of a condensing agent, for example, hydrochloric acid, until reaction ceased. Ammonia was added to the reaction product to neutralize any acidity that developed during the reaction process, and then steam was passed therethrough to remove any unreacted beta naphthol or butylaldehyde. To the reaction product thus formed, substantially two atomic weight portions of sulfur (64 parts) were added and the mixture heated to substantially 170 to 180° C. in the presence of substantially 0.2 part of a catalyst or condensing agent, for example iodine.

The preferred class of compounds have been employed in stocks other than tread stocks and have been found to function as valuable anti-oxidants. Thus the sulfur reaction product of the condensation product of substantially equi-molar portions of butylaldehyde and phenol has been incorporated in a pure gum stock comprising 100 parts of pale crepe rubber, 5 parts of zinc oxide, 3.5 parts of sulfur, .8 part of diphenyl-guanidine, 2.0 parts of anti-oxidant.

The stock was then vulcanized by heating sheets of the stock in the usual manner for forty-five minutes at the temperature given by forty pounds of steam pressure per square inch. Portions of the stock cured as described were then artificially aged by heating samples of the said rubber stock in an oxygen bomb for eighteen hours at a temperature of 75° C. and under a pressure of 400 pounds of oxygen per square inch. The results obtained by testing the aged and unaged stocks follow:

| Time of cure | Hours aged | Modulus of lbs./in.² at 300% | Elasticity in elongations of 500% | Tensile at break in lbs./in.² | Ultimate elongation |
|---|---|---|---|---|---|
| 45 minutes at 287° F. | 0 | 289 | 1048 | 3710 | 695 |
| 45 minutes at 287° F. | 18 | 302 | 1093 | 2780 | 650 |

The sulfur reaction product of other phenol and aliphatic aldehyde condensation products than those hereinbefore described may be employed as anti-oxidants. Thus I may employ as an anti-oxidant the sulfur reaction product of the condensation product of heptaldehyde, propionic aldehyde, aldol, acrolein and the like with phenol, hydroquinone, resorcinol, alpha and beta naphthol and analogous compounds.

By the term phenol, as employed in the present specification, is meant an aromatic hydrocarbon wherein one or more hydrogen atoms are substituted with hydroxyl groups.

In all the examples cited, diphenyl-guanidine was used as an accelerator simply because it is known to produce a vulcanized rubber stock that has very poor aging qualities. Other accelerators could, of course, be employed in a rubber stock in conjunction with the anti-oxidant set forth.

The various examples hereinbefore set forth in detail are to be understood as illustrative only and not at all limitative of the scope of the invention. This invention is limited solely by the claims attached hereto as a part of this specification.

What is claimed is:

1. The process of manufacturing a vulcanized rubber product possessing age resisting characteristics which comprises incorporating with said product, prior to vulcanization, a sulfur reaction product of the condensation product of an aliphatic aldehyde and an aryl hydroxide.

2. The process of manufacturing a vulcanized rubber product possessing age resisting characteristics which comprises incorporating with said product prior to vulcanization a sulfur reaction product of the condensation product of an aliphatic aldehyde and a phenol.

3. The process of manufacturing a vulcanized rubber product possessing age resisting characteristics which comprises incorporating with said product prior to vulcanization a sulfur reaction product of the condensation product of an aliphatic aldehyde and phenol.

4. The process of manufacturing a vulcanized rubber product possessing age resisting characteristics which comprises incorporating with said product prior to vulcanization a sulfur reaction product of the condensation product of butylaldehyde and a phenol.

5. The process of manufacturing a vulcanized rubber product possessing age resisting characteristics which comprises incorporating with said product prior to vulcanization a sulfur reaction product of the condensation product of butylaldehyde and phenol.

6. The process of manufacturing a vulcanized rubber product possessing age resisting characteristics which comprises incorporating with said product prior to vulcanization a sulfur reaction product of the condensation product of substantially equi-molar portions of butylaldehyde and phenol.

7. The process of manufacturing a vulcanized rubber product possessing age resisting characteristics which comprises incorporating with said product prior to vulcanization a product formed by reacting substantially one molar portion of sulfur with the reaction product of substantially equi-molar portions of an aliphatic aldehyde and a phenol.

8. The process of manufacturing a vulcanized rubber product possessing age resisting characteristics which comprises incorporating with said product prior to vulcanization a product formed by reacting substantially one molar portion of sulfur with the reaction product of substantially equi-molar portions of an aliphatic aldehyde and phenol.

9. The process of manufacturing a vulcanized rubber product possessing age resisting characteristics which comprises incorporating with said product prior to vulcanization a product formed by reacting substantially one molar portion of sulfur with the reaction product of substantially equi-molar portions of butylaldehyde and phenol.

10. An age resisting rubber product comprising the vulcanization product of a rubber stock containing prior to the vulcanization of said stock, a sulfur reaction product of the condensation product of an aliphatic aldehyde and an aryl hydroxide.

11. An age resisting rubber product comprising the vulcanization product of a rubber stock containing prior to the vulcanization of said stock a sulfur reaction product of the condensation product of an aliphatic aldehyde and a phenol.

12. An age resisting rubber product comprising the vulcanization product of a rubber stock containing prior to the vulcanization of said stock a sulfur reaction product of the condensation product of an aliphatic aldehyde and phenol 13. An age resisting rubber product comprising the vulcanization product of a rubber stock containing prior to the vulcanization of said stock a sulfur reaction product of the condensation product of butylaldehyde and a phenol.

14. An age resisting rubber product comprising the vulcanization product of a rubber stock containing prior to the vulcanization of said stock a sulfur reaction product of the condensation product of butylaldehyde and phenol.

15. An age resisting rubber product comprising the vulcanization product of a rubber stock containing prior to the vulcanization of said stock a sulfur reaction product of the condensation product of substantially equi-molar portions of butylaldehyde and phenol.

16. An age resisting rubber product comprising the vulcanization product of a rubber stock containing prior to the vulcanization of said stock a product formed by reacting substantially one molar portion of sulfur with the reaction product of substantially equi-molar portions of an aliphatic aldehyde and a phenol.

17. An age resisting rubber product comprising the vulcanization product of a rubber stock containing prior to the vulcanization of said stock a product formed by reacting substantially one molar portion of sulfur with the reaction product of substantially equi-molar portions of an aliphatic aldehyde and phenol.

18. An age resisting rubber product comprising the vulcanization product of a rubber stock containing prior to the vulcanization of said stock a product formed by reacting substantially one molar portion of sulfur with the reaction product of substantially equi-molar portions of butylaldehyde and phenol.

In testimony whereof I hereunto affix my signature.

WINFIELD SCOTT.